US009811584B2

(12) United States Patent
Adachi et al.

(10) Patent No.: US 9,811,584 B2
(45) Date of Patent: Nov. 7, 2017

(54) INFORMATION RETRIEVAL SYSTEM, METHOD, AND PROGRAM (75) Inventors: Noritaka Adachi, Kanagawa (JP);
Hiroshi Kurokawa, Tokyo (JP);
Kensuke Matsuoka, Chiba (JP);
Yosuke Murakami, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 532 days.

(21) Appl. No.: 14/235,151

(22) PCT Filed: May 1, 2012

(86) PCT No.: PCT/JP2012/061526
§ 371 (c)(1),
(2), (4) Date: May 19, 2014

(87) PCT Pub. No.: WO2013/021696
PCT Pub. Date: Feb. 14, 2013

(65) Prior Publication Data
US 2014/0250118 A1  Sep. 4, 2014

(30) Foreign Application Priority Data
Aug. 5, 2011 (JP) .................................. 2011-171639

(51) Int. Cl.
*G06F 17/30* (2006.01)
(52) U.S. Cl.
CPC .. *G06F 17/30648* (2013.01); *G06F 17/30386* (2013.01); *G06F 17/30675* (2013.01)
(58) Field of Classification Search
CPC ......... G06F 17/30675; G06F 17/30386; G06F 17/30648
(Continued)

(56) References Cited

U.S. PATENT DOCUMENTS

| 7,647,345 B2 * | 1/2010 | Trepess ............. G06F 17/30696 358/2.1 |
| 2004/0107195 A1 * | 6/2004 | Trepess ............. G06F 17/30607 707/999.003 |

(Continued)

FOREIGN PATENT DOCUMENTS

| CN | 1818908 A | 8/2006 |
| CN | 101251841 A | 8/2008 |

(Continued)

OTHER PUBLICATIONS

International Search Report for International Application No. PCT/JP2012/061526; PCT/ISA/210; Mailing Date: May 29, 2012; 2 pgs.

(Continued)

*Primary Examiner* — Phong Nguyen
(74) *Attorney, Agent, or Firm* — Cantor Colburn LLP (57) ABSTRACT An information retrieval method for retrieving documents relevant to a user's search inquiry from documents stored in the storage device using an arithmetic operation. The method includes receiving from a user a search query including a plurality of keywords, calculating relevance to a plurality of documents on the basis of the plurality of keywords and the influence set for each keyword, and displaying on the display device documents in the order of relevance. The method also includes displaying on the display device the influence set for each keyword, receiving changes to the displayed influence by the user, and recalculating the relevance on the basis of a change to the influence and displaying on the display device documents in the order of relevance.

18 Claims, 7 Drawing Sheets (58) Field of Classification Search
USPC .................................................. 707/728, 749
See application file for complete search history.

(56) References Cited

U.S. PATENT DOCUMENTS

| | | | | |
|---|---|---|---|---|
| 2005/0004949 | A1* | 1/2005 | Trepess | G06F 17/3089 707/E17.116 |
| 2005/0145851 | A1 | 7/2005 | Johnson et al. | |
| 2006/0156222 | A1* | 7/2006 | Chi | G06F 17/241 715/231 |
| 2006/0173818 | A1* | 8/2006 | Berstis | G06F 17/30864 707/E17.108 |
| 2010/0036802 | A1* | 2/2010 | Tsuruta | G06Q 30/0603 707/722 |
| 2011/0099066 | A1* | 4/2011 | Bilenko | G06Q 30/02 705/14.52 |
| 2011/0204417 | A1 | 8/2011 | Sato | |
| 2011/0282651 | A1* | 11/2011 | Nygaard | G06F 17/30719 704/9 |

FOREIGN PATENT DOCUMENTS

| | | |
|---|---|---|
| JP | H0784839 A | 3/1995 |
| JP | 20000172698 A | 6/2000 |
| JP | 2005085109 A | 3/2005 |
| JP | 2005310855 A | 11/2005 |
| JP | 2007531160 A | 11/2007 |
| JP | 2008257655 A | 10/2008 |
| JP | 2008287143 A | 11/2008 |
| JP | 2009272492 A | 11/2009 |
| JP | 2011086004 A | 4/2011 |
| JP | 2011171639 A | 9/2011 |
| WO | 2013021696 A1 | 2/2013 |

OTHER PUBLICATIONS

Search Report for PCT/JP2012/061526; PCT/ISA/237; May 29, 2012; 4 pgs.
Search Report for PCT/JP2012/061526; PCT/ISA/220; May 29, 2012; 2 pgs.
Search Report for PCT/JP2012/061526; May 8, 2011; PCT/ISA/210; 3 pgs.
Uekusa et al., "Proposal of key word weighting methods to improve utilities of web page", Proceedings of the 70th (Heisei 20 nen) Natinal Convention of Information Processing Society of Japan (1), Architecture, Software Science / Engineering, Database and Media, Mar. 13, 2008, pp. 1-511-1-512.

* cited by examiner

INFORMATION RETRIEVAL SYSTEM, METHOD, AND PROGRAM

CROSS-REFERENCE TO RELATED APPLICATION

This is a U.S. National Stage of Application No. PCT/JP2012/061526; filed on May 5, 2012; and assigned International Publication No. WO2013/021696A1; published on Feb. 14, 2013, which claims priority to Japanese Patent Application No. JP2011-171639; filed Aug. 5, 2011, the contents of each application in their entirety are herein incorporated by reference.

BACKGROUND

The present invention relates generally to an information retrieval system, method, and program and more specifically to a flexible information retrieval system, method, and program for receiving entries from a user such as search keywords, and displaying search results retrieved on the basis of these search keywords to direct the desired search results to the user.

In recent years, the amount of information has increased explosively along with the spread of the network society, and it is difficult to locate desired information in the large amount of information available. Among Web search systems are those in which keywords are used to narrow the search conditions. For example, in Google (registered trademark), dates and times can be entered in "search options" to further narrow search results.

BRIEF SUMMARY

Embodiments include an information retrieval method, system and computer program product for retrieving documents relevant to a user's search inquiry from documents stored in the storage device using an arithmetic operation. The method includes receiving from a user a search query including a plurality of keywords, calculating relevance to a plurality of documents on the basis of the plurality of keywords and the influence set for each keyword, and displaying on the display device documents in the order of relevance. The method also includes displaying on the display device the influence set for each keyword, receiving changes to the displayed influence by the user, and recalculating the relevance on the basis of a change to the influence and displaying on the display device documents in the order of relevance.

DETAILED DESCRIPTION

Figure 1:
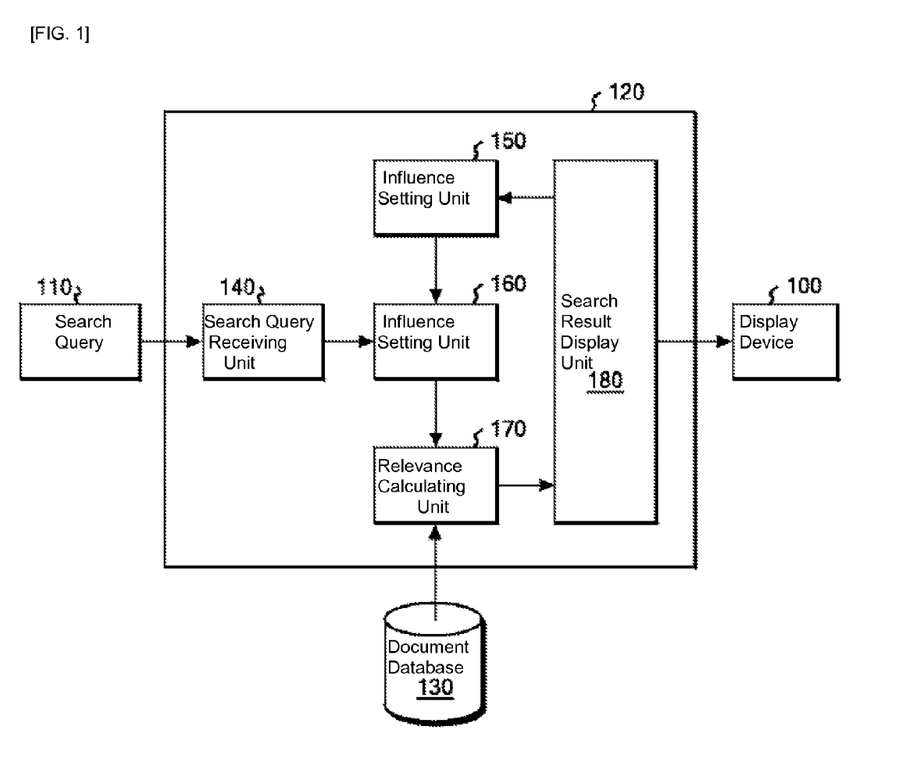
FIG. 1 is a diagram showing the configuration of an information retrieval system according to an embodiment of the present invention.

The following is a detailed explanation of a mode for carrying out the present invention with reference to the drawings. FIG. 1 is a diagram showing the configuration of an information retrieval system according to an embodiment of the present invention. Referring to FIG. 1, the information retrieval system 120 in this embodiment includes a search query receiving unit 140, an influence setting unit 160, a relevance calculating unit 170, a search result display unit 180, and an influence change receiving unit 150.

A search query 110 entered by the user is received by the search inquiry receiving unit 140. The keywords included in the search query 110 are extracted by the search query receiving unit 140, and then sent to the influence setting unit 160. The influence setting unit 160 sets the relevance for each keyword. Influence is a weight set for each keyword, and the initial value is 1. The relevance of a document recorded in a document database 130 and a search query 110 is calculated by the relevance calculating unit 170 on the basis of the influence (weight) set for the keyword. Relevance is described in greater detail below.

The search result display unit displays on the display device 100 documents according to the relevance calculated by the relevance calculating unit 170, preferably in order from highest to lowest relevance. Here, the search result display unit 180 displays the influence of each keyword along with the search results. Any change in influence by the user is received. When the influence change receiving unit has received a change in influence from the user, the influence of each keyword is set anew by the influence setting unit 160. The relevance is recalculated, and search results redisplayed. The influence can be repeatedly changed until the user obtains the desired search results.

The document database to be searched can be documents recorded electronically, internet information (web pages), electronic files such as images or video, or any structured information.

The influence changing means can change the influence of a date in the same manner as a keyword. If the influence of the data is greater, the influence of new information is higher. A specific data can be entered as the date by clicking a data using a pointer, etc.

Each of the configurational units described above can be realized by a program in which a computer executes the operations of each configurational unit.

Figure 2:
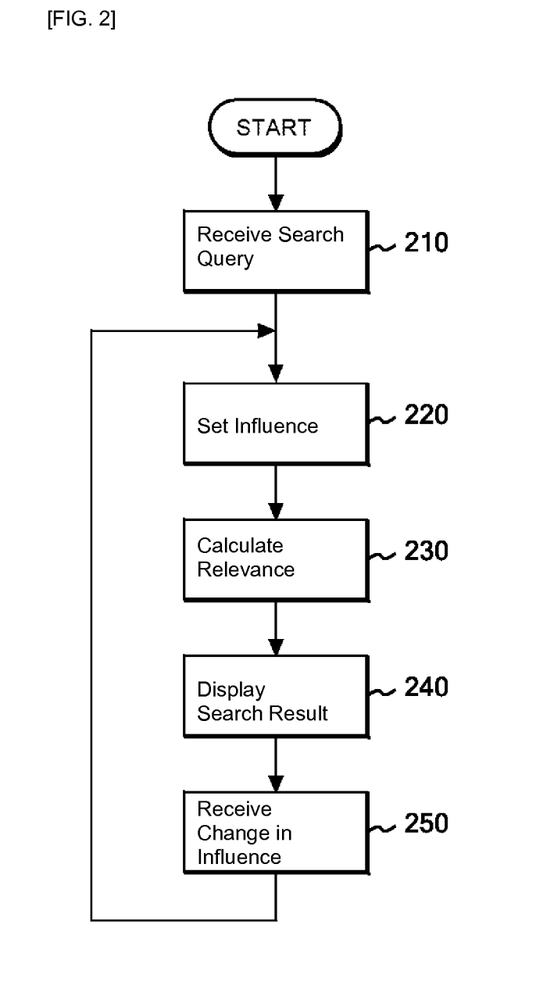
FIG. 2. is a flow chart representing the operations of the information retrieval system according to an embodiment of the present invention.

The operation of the information retrieval system in this embodiment equipped with the functions shown in the drawings will now be explained with reference to the drawings. FIG. 2 is a flow chart representing the operations of the information retrieval system according to an embodiment of the present invention.

Referring to FIG. 2, first, as shown at block 210, a search query entered by the user is received by the search query receiving unit 140. As shown at block 210, the keywords in the search query are extracted. As shown at block 220, the influence (weight) of each extracted keyword is set. When the process is performed initially, 1 is set as the initial value for each keyword. An initial value of 1 is also set for the influence of the date.

Next, as shown at block 230, the relevance of the search query to a document to be searched is calculated. The relevance is calculated according to the following equation:

$$\text{Score}(q, d) = \text{coord}(q, d) \times \text{queryNorm}(q) \times \left( \sum_{t \in q} tf(t, d) \times (idf(t))^2 \times \text{boost}(t) \times \text{norm}(t, d) \right) + (\text{date}(d)) \times (\text{dateBoost}) \Big).$$

The meanings of the variable parameters in the equation are as follows: q: Search query; d: Document whose score is to be calculated; t: Keyword in query q; coord(q,d): A coefficient determined by the number of keywords in query q appearing in document d; queryNorm(q): A normalization coefficient for comparing scores between queries (relevance to the present invention is low); tf(t,d): A coefficient determined by the frequency of keyword t appearing in document d; idf(t): A coefficient determined by the reciprocal of the proportion of documents containing keyword t in the entire search; boost(t): Influence (weight) of keyword t. This value can be changed by the influence change receiving unit 150; norm(t,d): Another coefficient such as the weight when the search index was created (relevance to the present invention is low); date(d): A coefficient determined by the date of document d. (A higher value means a date closer to the current date.); and dateBoost: The weight for the date. This value can be changed by the influence change receiving unit 150. The equation described above is one example of an equation for calculating relevance. An equation for calculating relevance can be considered in which the influence of each keyword and the influence of the date can be changed.

Next, as shown at block 240, the documents are displayed as search results in order from highest to lowest relevance with respect to the search query. The search result display unit 240 displays an influence bar in which each keyword and the date are displayed in linear fashion (in rows). The user can change the influence of each keyword and the influence of the date in the influence bar using a GUI or keyboard.

The influence can be changed by the user with a pointer or a keyboard and cursor. When the user manipulates the influence bar, the content of the manipulation is detected by the influence change receiving unit, and the changed influence is sent to the influence setting unit 160. Preferably, the influence of each keyword and the data in the influence bar are changed by moving a keyword boundary using a pointer, etc.

Figure 3:
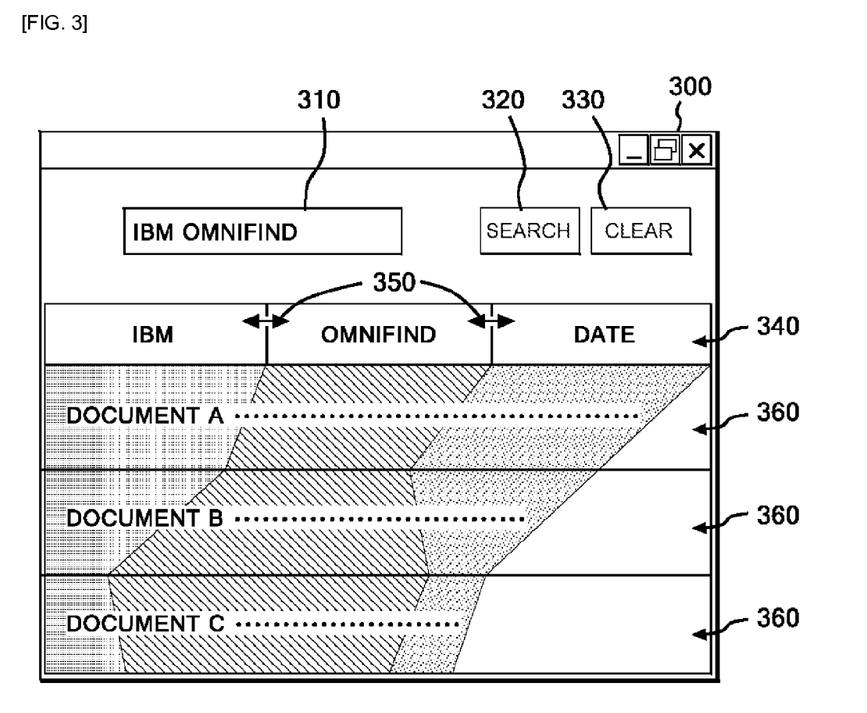
FIG. 3 is an example of the search screen in the information retrieval system according to an embodiment of the present invention.

FIG. 3 is an example of the search screen in the information retrieval system according to an embodiment of the present invention. In general, the display area 300 in the information retrieval system of the present invention includes a search query entry field 310, a search button 320, a search query clear button 330, an influence change bar 340, and a search result display area 360. In FIG. 3, two search keywords have been entered into the search query entry field 310. These keywords are "IBM" and "OMNIFIND". When the search button 320 has been selected, the documents with high relevance are displayed as search results in the search result display area 360.

Each keyword and the date are displayed in a row at equal intervals in the influence change bar 340. Equal interval means the influence of each keyword and the date have been set to 1. Here, the user can change the influence of each keyword and the date by sliding the keyword boundaries 350 to the left and right using a pointer such as a mouse. Information that the influence has been changed is sent from the influence change receiving unit 150 to the influence setting unit 160, the influence is changed, and another search is performed. In this way, the influence of any keyword can be changed, and the search can be refined to obtain the search results desired by the user.

In FIG. 3, each document in the search result display area 360 is displayed so that the extent to which each keyword affected the calculation of relevance can be recognized. In this way, the user can understand which keywords had an effect on the search results. By connecting the relevance of the same keyword in each document using a line, the change in relevance in each document can be recognized using gradation.

In FIG. 3, the overall relevance of each document to the query is represented by the line at the top. However, a line at the bottom or a line in the middle can also be used. A gradation for document relevance can be created by connecting the overall relevance using a line. In each drawing, Document A-F refers to document titles or document names. Preferably, sample content from the documents is displayed.

Figure 4:
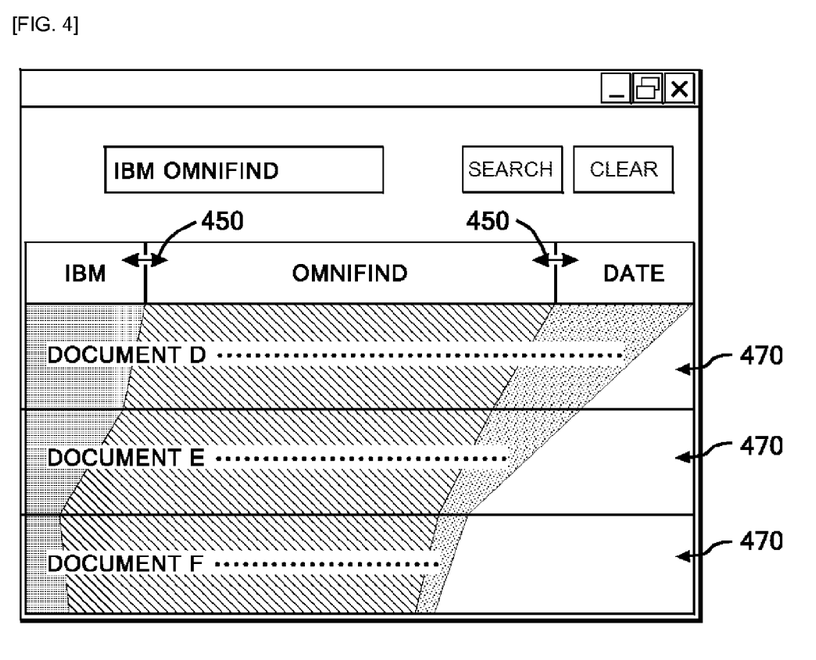
FIG. 4 is an example of a search screen in which the keyword boundaries have been moved.

FIG. 4 is an example of a search screen in which the keyword boundaries 450 have been moved to increase the influence of the keyword "OMNIFIND". Different documents are displayed in the search results 470 because their relevance to "OMNIFIND" is higher than those displayed in the search results 360 in FIG. 3.

Figure 7:
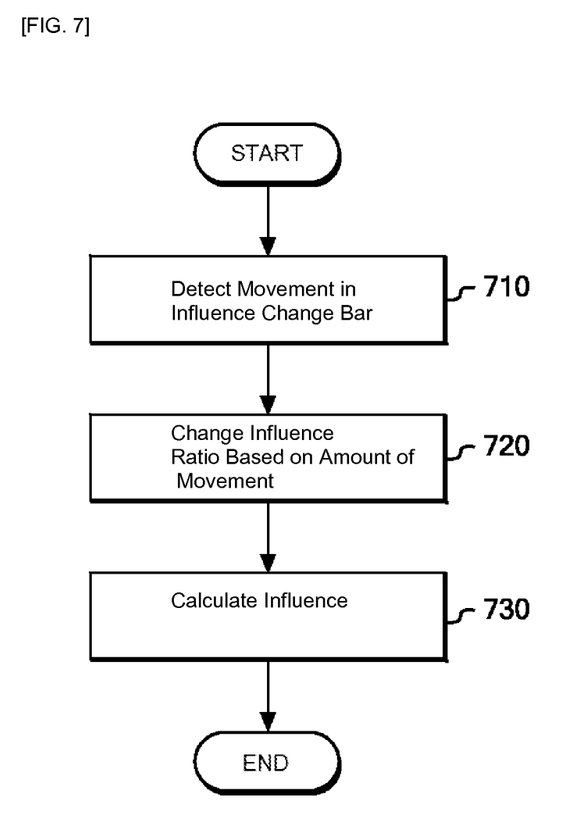
FIG. 7 is a more detailed flow chart of the operations performed by the influence [change] receiving unit 150.

FIG. 7 is a more detailed flow chart of the operations performed by the influence [change] receiving unit 150. As shown at block 710, it is determined whether the keyword boundaries in the influence bar have been moved. As shown at block 720, the influence ratio is changed for each keyword in accordance with the amount each keyword boundary has been moved.

For example, when the keyword boundary for "OMNIFIND" has been moved towards "IBM", the influence for "OMNIFIND" and "IBM" are both changed in accordance with the amount of movement. In the calculating method, each influence is changed so as to be proportional to the ratio of the horizontal line segments of the keywords after movement. For example, when the line segment ratio of "IBM", "OMNIFIND", and "DATE" is 1:3:2, the new influence for each keyword is calculated as shown at block 730 as 3/6, 9/6, and 6/6. These results are set as the new influence settings by the influence setting change unit 160.

In this embodiment, as described above, a user interface is provided in which the user is led to the desired search results while viewing the influence of each keyword on the search results. In this way, a refined search rich in usability can be performed.

Figure 5:
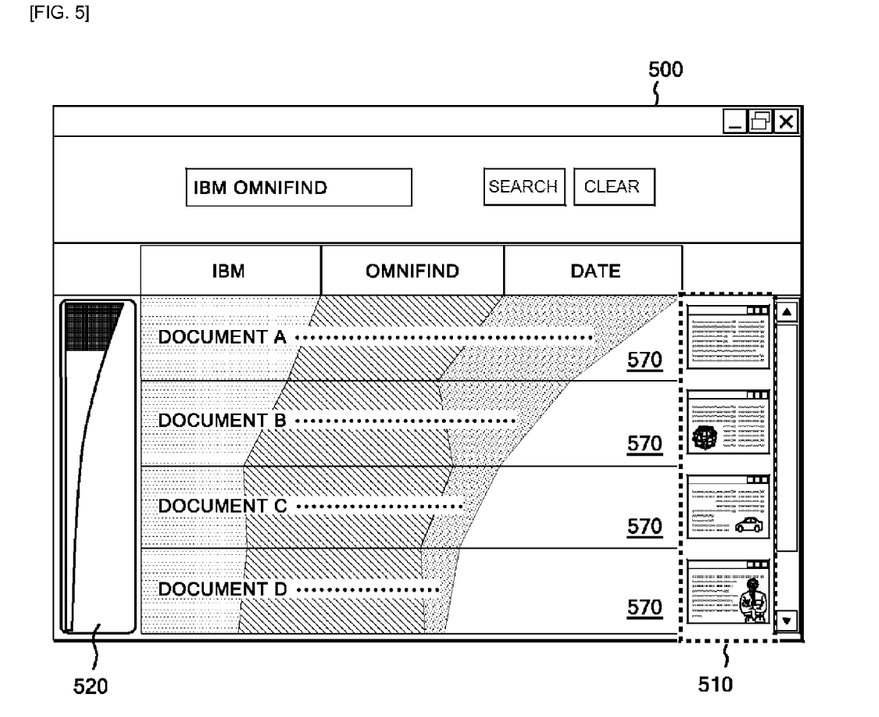
FIG. 5 is a diagram explaining a modified embodiment of the present invention.

FIG. 5 is a diagram explaining a modified embodiment of the present invention. In the display area 510, content of each retrieved document is sampled and displayed as an image. In this way, the user can easily determine what documents have been retrieved.

Display area 520 is a reduced display of all of the search results and is used to determine the position of each document in the search results for all retrieved documents. In the example shown in FIG. 5, the display attributes (brightness, color, highlighting, etc.) of the top four documents in the display area 520 have been changed. By selecting any position in display area 520, the search results corresponding to the position are called up and displayed in display area 570.

The displayed search results can also be moved by manipulating the scroll bar 530 using a pointer. In response, the position of the documents is displayed in display area 520 and their attributes are changed.

Exemplary embodiments of the present invention have been explained above. However, the implementation method can be selected in accordance with the purpose and scale of the information retrieval system, and additional modifications are possible. For example, the influence change bar can be displayed vertically.

Figure 6:
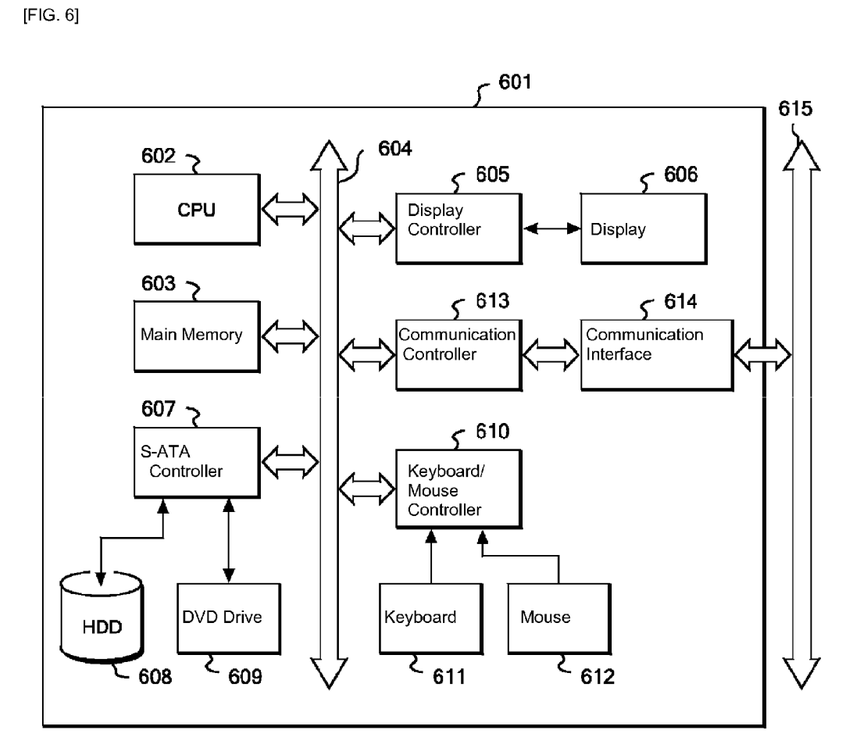
FIG. 6 is a block diagram of an example of computer hardware used in a retrieval system of the present invention.

FIG. 6 is a block diagram of an example of computer hardware used in a retrieval system of the present invention. A retrieval system (601) according to an embodiment of the present invention includes a CPU (602) and a main memory (603), and these are connected to a bus (604). The CPU (602) is preferably based on a 32-bit or 64-bit architecture. Examples include the Xeon (trademark) series, the Core (trademark) series, the Atom (trademark) series, the Pentium (trademark) series, and the Celeron (trademark) series from Intel, and the Phenom (trademark) series, the Athlon (trademark) series, the Turion (trademark) series, and the Sempron (trademark) series from AMD.

A display (606) such as an LCD monitor is connected to the bus (604) via a display controller (605). The display (606) is used to display the search results of the present invention and to display a pointer. A hard disk or silicon disk (608) and a CD-ROM, DVD drive or Blu-ray drive (609) are also connected via an IDE or SATA controller (607) to the bus (604). The program for the present invention and the document database to be searched can be stored in these storage devices. The program of the present invention and the documents to be searched are preferably stored on a hard disk (608) or in the main memory (603). The program is executed by the CPU (602), and a search is performed based on a relevance calculation.

If necessary, a CD-ROM, DVD, or Blu-ray drive (609) can be used to install the program of the present invention from a computer-readable medium such as a CD-ROM, DVD-ROM or Blu-ray disk to a hard drive or to retrieve data from these disks. A keyboard (611) and mouse (612) are also connected to the bus (604) via a keyboard/mouse controller (610). Preferably, a mouse (612) is used to move the keyword boundaries 350 in the influence change bar 340 and change the influence of each keyword.

The communication interface (614) can use, for example, the Ethernet (trademark) protocol. The communication interface (614) is connected to the bus (604) via a communication controller (613). An outside document database can be searched via communication lines, and the results processed by the CPU (602).

The information retrieval program of the present invention can be realized by a device-executable program written in an object-oriented programming language such as C++, Java (registered trademark), Java (registered trademark) Beans, Java (registered trademark) Applet, Java (registered trademark) Script, Perl, or Ruby. This program can be stored on a computer-readable recording medium and distributed or transmitted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. An information retrieval system having a storage device, a display device and a processor, wherein the processor is configured to:
receive from a user a search query including a plurality of keyword;
calculate a relevance to a plurality of documents on the basis of the plurality of keywords and an influence set for each keyword (t), wherein the relevance is calculated based on:
a coefficient (coord(q,d)) determined by a number of keywords in a search query (q) in a document (d);
a coefficient tf(t,d) determined by a frequency of a keyword (t) appearing in the document (d);
a coefficient idf(t) determined by a reciprocal of a proportion of documents containing the keyword t;
a weight (boost(t)) of the keyword t;
a coefficient indicative of weight (norm(t,d)) indicative of when a search index was created;
a coefficient (date(d)) determined by a date of the document d; and
a weight for the date (dateBoost); and
wherein the relevance (score) is calculated by:
Score$(q,d)$=coord$(q,d)$×queryNorm$(q)$×($\Sigma$tf$(t,d)$×(idf$(t))$2×boost$(t)$×norm$(t,d)$+(date $(d)$)×(dateBoost));
display on the display device documents in the order of relevance;
display on the display device the influence set for each keyword;
receive changes to the displayed influence set from the user; and
recalculate the relevance on the basis of a change to the influence set and display on the display device documents in the order of relevance.

2. The information retrieval system of claim 1, wherein the relevance of a document is calculated on the basis of a plurality of keywords, the influence set for each keyword, and a date.

3. The information retrieval system of claim 2, wherein the date has the same influence as a keyword, and the influence can be changed in the same manner as a keyword.

4. The information retrieval system of claim 1, wherein the processor is further configured to display on the display device the influence of each keyword in each retrieved document.

5. The information retrieval system of claim 1, wherein the influence of each keyword is displayed linearly and the influence of each keyword changes in accordance with movement of a boundary of each linearly displayed keyword.

6. The information retrieval system of claim 5, wherein the information retrieval system further comprises a pointing device, a boundary of a keyword is displayed as a slide bar on the display device, and the influence is changed by operating the slide bar using the pointing device.

7. A computer-implemented information retrieval method-comprising:

receiving, via a processor, a search query from a user, wherein the search query comprises a plurality of keywords;

calculating, via the processor, a relevance to a plurality of documents, wherein the relevance is based on the plurality of keywords and an influence set for each keyword, wherein the relevance is calculated based on a mathematical product of:
- a number of keywords in a search query in a document;
- a frequency of a keyword appearing in the document;
- a proportion of documents containing the keyword;
- a weight of the keyword; and
- a weight for a date indicative of when a search index was created;

displaying on the display device, via the processor, documents in the an order of relevance;

displaying on the display device, via the processor, the influence set for each keyword;

receiving, via the processor, changes to the displayed influence by the user; and recalculating, via the processor, the relevance on the basis of a change to the influence and displaying on the display device documents in the order of relevance.

8. The information retrieval method of claim 7, wherein the relevance of a document is calculated on the basis of a plurality of keywords, the influence set for each keyword, and a date.

9. The information retrieval method of claim 8, wherein the date has the same influence as a keyword, and the influence can be changed in the same manner as a keyword.

10. The information retrieval method of claim 7, further comprising displaying on the display device the influence of each keyword in each retrieved document.

11. The information retrieval method of claim 7, further comprising displaying the influence of each keyword linearly, and changing the influence of each keyword in accordance with movement of a boundary of each linearly displayed keyword.

12. The information retrieval method of claim 11, wherein the information retrieval method further comprises a pointing device, a boundary of a keyword is displayed as a slide bar on the display device, and the influence is changed by operating the slide bar using the pointing device.

13. A non-transitory computer readable storage medium having computer readable program code embodied therewith, the computer readable program code executable to cause a processor to perform a method for operating an information retrieval system, the method comprising:

receiving, via a processor, a search query from a user, wherein the search query comprises a plurality of keywords;

calculating, via the processor, relevance to a plurality of documents on the basis of the plurality of keywords and an influence set for each keyword, wherein the relevance is calculated a mathematical product of:
- a number of keywords in a search query in a document;
- a frequency of a keyword appearing in the document;
- a proportion of documents containing the keyword;
- a weight of the keyword; and
- a weight for a date indicative of when a search index was created;

displaying, via the processor, on a display device documents in the order of relevance;

displaying on the display device, via the processor, an influence set for each keyword;

receiving, via the processor, changes to the displayed influence by the user; and recalculating the relevance, via the processor, on the basis of a change to the influence and displaying on the display device documents in the order of relevance.

14. The computer program product of claim 13, wherein the relevance of a document is calculated on the basis of a plurality of keywords, the influence set for each keyword, and a date.

15. The computer program product of claim 14, wherein the date has the same influence as a keyword, and the influence can be changed in the same manner as a keyword.

16. The computer program product of claim 13, further comprising displaying on the display device the influence of each keyword in each retrieved document.

17. The computer program product of claim 13, further comprising displaying the influence of each keyword linearly, and changing the influence of each keyword in accordance with movement of a boundary of each linearly displayed keyword.

18. The computer program product of claim 17, wherein the information retrieval method further comprises a pointing device, a boundary of a keyword is displayed as a slide bar on the display device, and the influence is changed by operating the slide bar using the pointing device.

* * * * *